United States Patent
Joo et al.

(10) Patent No.: US 11,543,027 B1
(45) Date of Patent: Jan. 3, 2023

(54) LINE PRESSURE CONTROL METHOD FOR DCT

(71) Applicants: Hyundai Motor Company, Seoul (KR); Kia Corporation, Seoul (KR)

(72) Inventors: Ki Hyung Joo, Gyeonggi-Do (KR); Young Ho Ko, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/692,003

(22) Filed: Mar. 10, 2022

(30) Foreign Application Priority Data

Jul. 26, 2021 (KR) .......................... 10-2021-0097982

(51) Int. Cl.
*F16H 61/688* (2006.01)
*F16H 61/00* (2006.01)
*F16H 61/28* (2006.01)

(52) U.S. Cl.
CPC ....... *F16H 61/688* (2013.01); *F16H 61/0031* (2013.01); *F16H 2061/0093* (2013.01); *F16H 2061/2853* (2013.01)

(58) Field of Classification Search
CPC ............... F16H 61/688; F16H 61/0031; F16H 2061/0093; F16H 2061/2853; F16D 48/062; F16D 48/066; F16D 2500/3024; F16D 2500/70406; F16D 2500/70684
See application file for complete search history.

(56) References Cited

U.S. PATENT DOCUMENTS

| | | | |
|---|---|---|---|
| 10,830,342 B2 | 11/2020 | Ko et al. | |
| 2007/0232445 A1 | 10/2007 | Yamamoto et al. | |
| 2012/0277964 A1 | 11/2012 | Bai et al. | |
| 2015/0247571 A1 | 9/2015 | Ammler | |
| 2015/0369307 A1* | 12/2015 | Yoshino | B60K 23/08 701/67 |
| 2017/0335951 A1* | 11/2017 | Fukuda | F16H 61/0031 |
| 2020/0166086 A1* | 5/2020 | Ko | F16D 48/066 |

FOREIGN PATENT DOCUMENTS

| | | |
|---|---|---|
| JP | 2021-060693 | 4/2021 |
| KR | 10-1791313 | 10/2017 |
| KR | 10-2018-0067254 | 6/2018 |
| KR | 10-2020-0061854 | 6/2020 |

* cited by examiner

*Primary Examiner* — Timothy Hannon
(74) *Attorney, Agent, or Firm* — Morgan, Lewis & Bockius LLP

(57) ABSTRACT

A line pressure control method for a double clutch transmission (DCT) includes estimating a line pressure, which decreases with stoppage of an electric oil pump, based on a linear regression model using state variables of the DCT that are related to a line pressure change, and driving the electric oil pump when the line pressure estimated based on the linear regression model reaches a predetermined lower limit.

19 Claims, 4 Drawing Sheets

FIG. 4

| SEQUENCE | VARIABLE | COEFFICIENT |
|---|---|---|
| 1 | $X_2$ | $P_1$ |
| 2 | $X_1$ | $P_2$ |
| 3 | $X_0$ | $P_3$ |
| 4 | $X_3$ | $P_4$ |
| 5 | $ST_1$ | $P_5$ |
| 6 | $ST_2$ | $P_6$ |
| 7 | $ST_3$ | $P_7$ |
| 8 | $ST_4$ | $P_8$ |
| 9 | $ST_5$ | $P_9$ |
| 10 | $ST_6$ | $P_{10}$ |
| 11 | $ST_7$ | $P_{11}$ |
| 12 | $ST_8$ | $P_{12}$ |
| 13 | $ST_9$ | $P_{13}$ |
| 14 | $ST_{10}$ | $P_{14}$ |
| 15 | $ST_{11}$ | $P_{15}$ |

LINE PRESSURE CONTROL METHOD FOR DCT

CROSS REFERENCE TO RELATED APPLICATION

The present application claims priority to Korean Patent Application No. 10-2021-0097982, filed Jul. 26, 2021, the entire contents of which is incorporated herein for all purposes by this reference.

BACKGROUND OF THE PRESENT DISCLOSURE

Field of the Present Disclosure

The present disclosure relates to a technology of controlling a line pressure which is supplied to a double clutch transmission (DCT).

DESCRIPTION OF RELATED ART

A wet-type DCT is configured to be able to control two clutches and drive an actuator for changing the positions of shift gears using a supplied hydraulic pressure.

The hydraulic pressure is generated by an electric oil pump, a line pressure detector is disposed in the hydraulic pressure line supplied to the DCT from the electric oil pump, and the line pressure may be appropriately maintained by appropriately controlling the electric oil pump.

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a line pressure control method for a double clutch transmission (DCT), the method being able to accurately estimate a line pressure and drive again an electric oil pump at an appropriate point in time so that a line pressure required for the DCT may be continuously maintained at an appropriate level even without a line pressure detector that can measure a line pressure which is supplied to the DCT, being able to reduce the costs for configuring a hydraulic system of the DCT.

To achieve the objectives, a line pressure control method for a double clutch transmission (DCT) of the present disclosure includes: estimating a line pressure, which decreases with stoppage of an electric oil pump, based on a linear regression model using state variables of the DCT that are related to a line pressure change: and driving the electric oil pump when the line pressure estimated based on the linear regression model reaches a predetermined lower limit.

The state variables of the DCT that are used for the linear regression model may include two or more of the followings:

$ST_1$: line pressure when electric oil pump is stopped,
$ST_2$: first clutch torque,
$ST_3$: first clutch torque and inclination of pressure model,
$ST_4$: non-corrected first clutch target pressure,
$ST_5$: operation state of electric oil pump,
$ST_6$: corrected first clutch target pressure,
$ST_7$: estimated first clutch torque based on torque and pressure model,
$ST_8$: value measured by first clutch pressure detector,
$ST_9$: second clutch torque,
$ST_{10}$: first gear solenoid position, and
$ST_{11}$: second gear solenoid position.

Absolute values of coefficients of the state variable of the DCT that are used for the linear regression model may gradually decrease in accordance with a sequence.

The linear regression model may include a fundamental variable and predetermined derivative variables derived from the fundamental variable other than the state variables of the DCT.

The linear regression model may include several derivative variables.

The fundamental variable may be $X_0$ and the derivative variables may include one or more of $X_1=X_0^2$, $X_2=X_0^3$, and $X_3=X_0^{0.5}$.

In the linear regression model, the coefficients of the fundamental variable and the derivative variables may be set greater than the coefficients of the state variables of the DCT.

The fundamental variable and the derivative variables of the linear regression model may have a relationship of coefficient of $X_2$|>|coefficient of $X_1$|>|coefficient of $X_0$|>|coefficient of $X_3$|.

The linear regression model may be expressed as $Y=P_1*X_2+P_2*X_1+P_3*X_0+P_4*X_3+P_5*ST_1+P_6*ST_2+P_7*ST_3+P_8*ST_4+P_9*ST_5+P_{10}*ST_6+P_{11}*ST_7+P_{12}*ST_8+P_{13}*ST_9+P_{14}*ST_{10}+P_{15}*ST_{11}$, where $P_1$, $P_2$, $P_3$, $P_4$, $P_5$, $P_6$, $P_7$, $P_8$, $P_9$, $P_{10}$, $P_{11}$, $P_{12}$, $P_{13}$, $P_{14}$ and $P_{15}$ may be coefficients of the variables, respectively.

The coefficients of $P_1$, $P_2$, $P_3$, $P_4$, $P_5$, $P_6$, $P_7$, $P_8$, $P_9$, $P_{10}$, $P_{11}$, $P_{12}$, $P_{13}$, $P_{14}$ and $P_{15}$ may have a relationship of $|P_1|>|P_2|>|P_3|>|P_4|>|P_5|>|P_6|>|P_7|>|P_8|>|P_9|>|P_{10}|>|P_{11}|>|P_{12}|>|P_{13}|>|P_{14}|>|P_{15}|$.

The first gear solenoid position may be a spool position of a solenoid that drives an actuator provided to be able to engage a first gear of the DCT, and the second gear solenoid position may be a spool position of a solenoid that drives an actuator provided to be able to engage the second gear of the DCT.

According to an exemplary embodiment of the present disclosure, it is possible o to accurately estimate a line pressure and drive again an electric oil pump at an appropriate point in time so that a line pressure required for the DCT may be continuously maintained at an appropriate level even without a line pressure detector that can measure a line pressure which is supplied to the DCT, being able to reduce the costs for configuring a hydraulic system of the DCT.

Because there is no line pressure detector, there is no need for a relief valve which is required in preparation for breakage of the line detector. Therefore, the costs for configuring the hydraulic system may be reduced.

When a vehicle is provided with a line pressure detector and the line pressure detector breaks, the vehicle may be more stably moved to a repair shop in a limp home mode because the line pressure may be more accurately estimated, so malfunction and deterioration of durability of the DCT may be prevented.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 4 is a table showing the relationship between variables and coefficients of a linear regression model according to an exemplary embodiment of the present disclosure.

Figure 1:
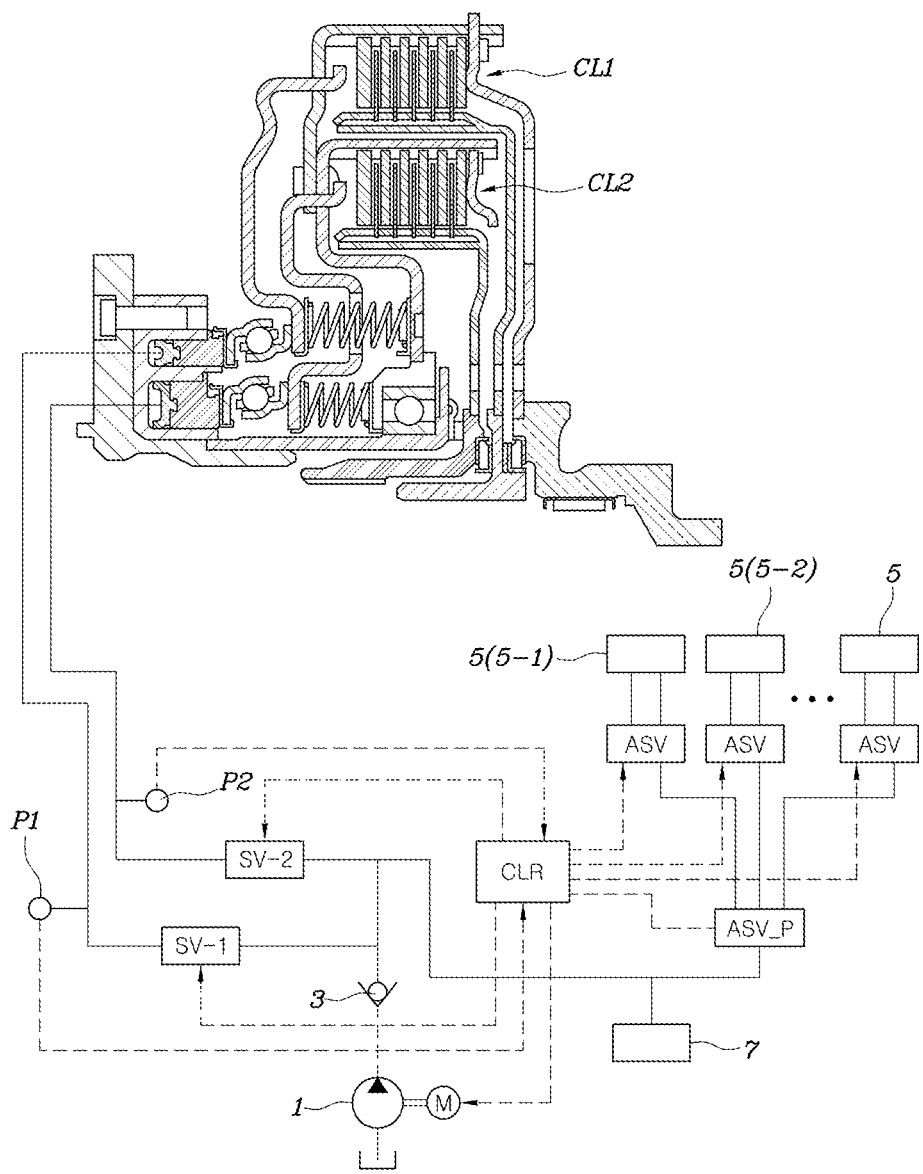
FIG. 1 is a diagram illustrating the configuration of a double clutch transmission (DCT) to which the present disclosure may be applied.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, the structural or functional description specified to exemplary embodiments according to the concept of the present disclosure is directed to describe the exemplary embodiments of the present disclosure, so it may be understood that the present disclosure may be variously embodied, without being limited to the exemplary embodiments of the present disclosure.

Embodiments described herein may be changed in various ways and various shapes, so specific embodiments are shown in the drawings and will be described in detail in the exemplary embodiment of the present disclosure. However, it should be understood that the exemplary embodiments according to the concept of the present disclosure are not limited to the embodiments which will be described hereinbelow with reference to the accompanying drawings, but all of modifications, equivalents, and substitutions are included in the scope and spirit of the present disclosure.

It will be understood that, although the terms first and/or second, etc. may be used herein to describe various elements, these elements should not be limited by these terms. These terms are only used to distinguish one element, from another element. For instance, a first element discussed below could be termed a second element without departing from the right range of the present disclosure. Similarly, the second element could also be termed the first element.

It is to be understood that when one element is referred to as being "connected to" or "coupled to" another element, it may be directly connected to or directly coupled to another element or be connected to or coupled to another element having the other element intervening therebetween. On the other hand, it may to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent" or "directly adjacent" should be interpreted in the same manner as those described above.

The terminology used herein is for the purpose of describing various exemplary embodiments only and is not intended to limit the present disclosure. Singular forms are intended to include plural forms unless the context clearly indicates otherwise. It will be further understood that the terms "comprises" or "have" used in the exemplary embodiment, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

The present disclosure will be described hereafter in detail by describing exemplary embodiments of the present disclosure with reference to the accompanying drawings. Like reference numerals provided in the drawings indicate like components.

FIG. 1 is a diagram illustrating the configuration of a double clutch transmission (DCT) to which the present disclosure may be applied. An electric oil pump 1 which is driven by a motor M is controlled by a controller CLR.

Oil pumped by the electric oil pump 1 passes through a check valve 3 and is then supplied to two clutches CL1 and CL2 forming a double clutch transmission (DCT) through two solenoid valves SV-1 and SV-2 that are separately provided. The pressure of the oil which is supplied to the clutches may be measured respectively by pressure detectors P1 and P2 that are separately provided.

The two clutches CL1 and CL2 are multi-plate clutches each including several plates and discs, and when pressure which is applied by pistons is increased by provided hydraulic pressure, transfer torque of the clutches is increased.

The two clutches are a first clutch CL1 and a second clutch CL2. The first clutch CL1 may be set to be used to engage odd-numbered gears of a series of gears and the second clutch CL2 may be set to be used to engage even-numbered gears.

There is no separate pressure detector for measuring the line pressure which is generated in the hydraulic pressure line between the check valve 3 and the two solenoid valves SV-1 and SV-2.

The line pressure is provided to be able to drive several actuators 5 for shifting gears of the DCT. The line pressure enables an accumulator 7 to maintain a stable hydraulic pressure.

In the actuators 5, one that can engage a first gear and one that can engage a second gear are distinguished. Referring to FIG. 1, the actuator provided to be able to engage the first gear and the actuator provided to be able to engage a second gear are indicated by 5-1 and 5-2, respectively.

Obviously, the actuators 5 are also controlled by specific solenoid valves that are controlled by the controller CLR and these solenoid valves are indicated by 'ASV' in FIG. 1 to be discriminated from the two solenoid valves SV-1 and SV-2 for controlling the clutches.

For reference, the solenoid valve indicated by 'ASV_P' in FIG. 1 is one for controlling the hydraulic pressure which is supplied to the actuators.

Figure 2:
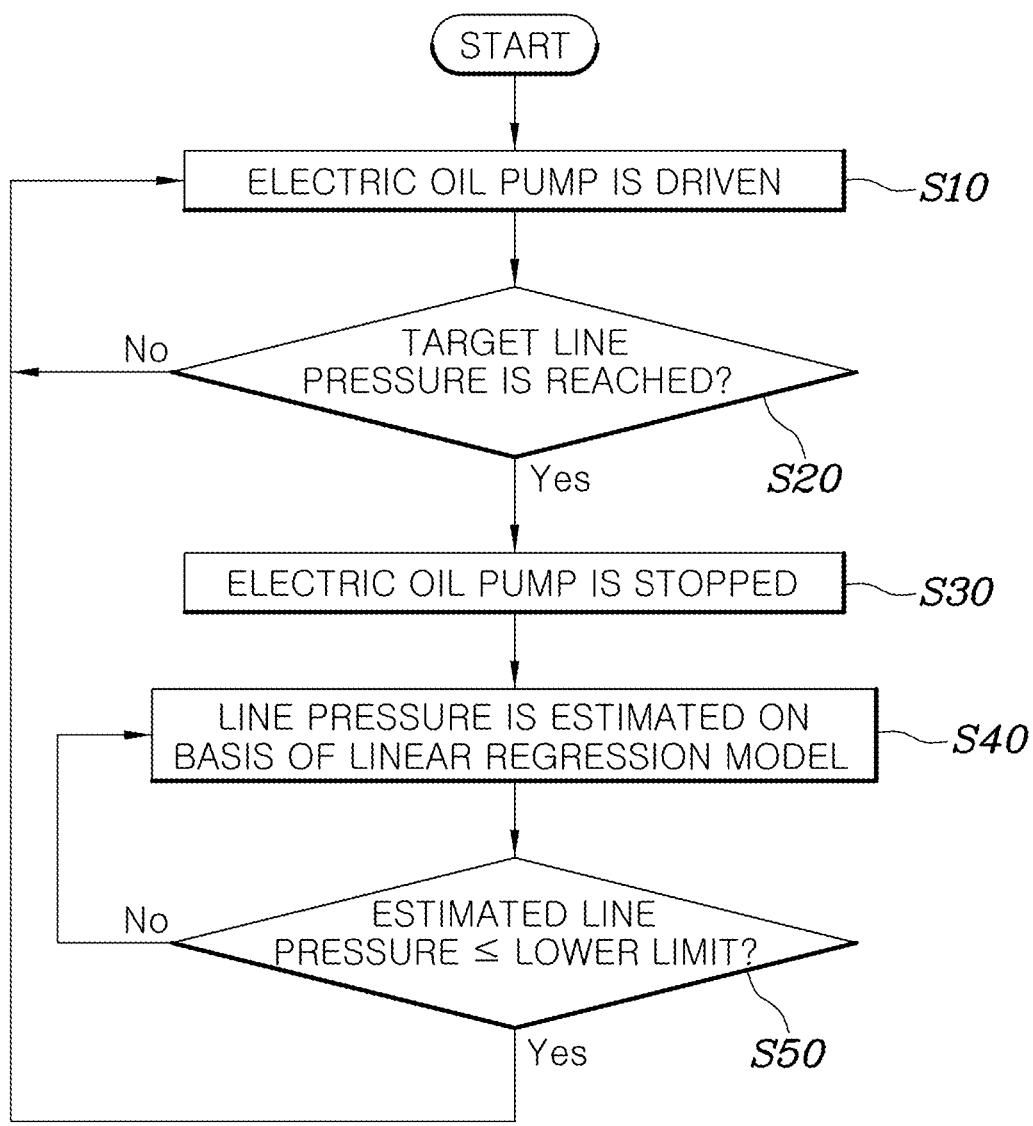
FIG. 2 is a flowchart showing an exemplary embodiment of a line pressure control method for a double clutch transmission (DCT) according to an exemplary embodiment of the present disclosure.
Figure 3:
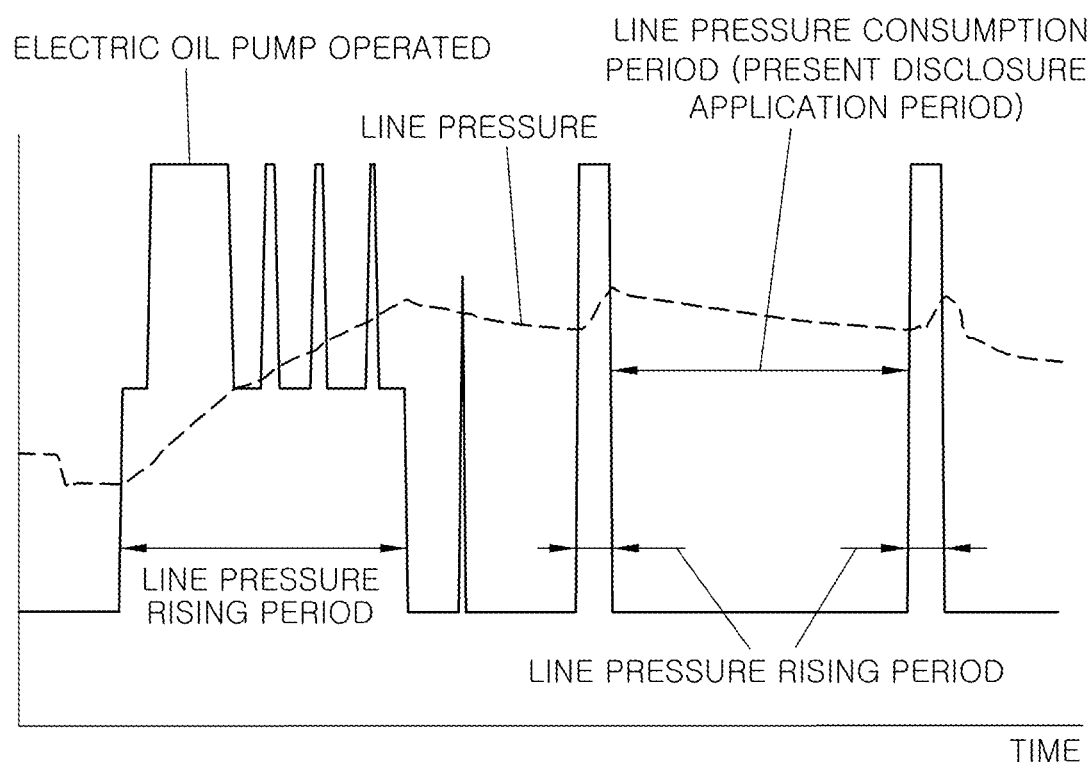
FIG. 3 is a graph illustrating application of the control method of the present disclosure.

Referring to FIG. 2 and FIG. 3, an exemplary embodiment of a line pressure control method for a double clutch transmission (DCT) of the present disclosure includes: estimating a line pressure, which decreases with stoppage of an electric oil pump, based on a linear regression model using state variables of a double clutch transmission (DCT) that are related to a line pressure change (S40); and driving the electric oil pump when the line pressure estimated based on the linear regression model reaches a predetermined lower limit (S10).

That is, according to an exemplary embodiment of the present disclosure, the electric oil pump is drive (10), and when the line pressure reaches a target line pressure (S20), the electric oil pump is stopped (S30) and the line pressure that decreases is estimated using the linear regression model without a specific line pressure detector (S40). Furthermore, when the estimated line pressure reaches the lower limit (S50), the electric oil pump is driven (S10) and control for increasing the line pressure up to the target line pressure is repeated so that line pressure required for a double clutch transmission (DCT) may be stably supplied.

Accordingly, the hydraulic system of a double clutch transmission (DCT) does not need to have a line pressure detector, and accordingly, there is no need for a relief valve of a hydraulic line which is required to protect the system in preparation for breakage of the line detector. Therefore, the costs for configuring the hydraulic system may be reduced.

For reference, it is possible to determine whether the line pressure reaches the target line pressure when the electric oil pump is driven, based on whether the line pressure estimated from the driving current of the electric oil pump reaches the target line pressure.

The lower limit, which is a pressure at a level at which an appropriate operation state of the DCT may be secured in accordance with the object and several tests and analysis, may be set in consideration of a slight tolerance, and for example, may be set as 10 bar, etc.

The state variables of the DCT that are used for the linear regression model may include two or more of the followings:

$ST_1$: line pressure when electric oil pump is stopped,
$ST_2$: first clutch torque,
$ST_3$: first clutch torque and inclination of pressure model,
$ST_4$: non-corrected first clutch target pressure,
$ST_5$: operation state of electric oil pump,
$ST_6$: corrected first clutch target pressure,
$ST_7$: estimated first clutch torque based on torque and pressure model,
$ST_8$: value measured by first clutch pressure detector,
$ST_9$: second clutch torque,
$ST_{10}$: first gear solenoid position, and
$ST_{11}$: second gear solenoid position.

The state variables are ones having relatively large influence sequentially selected from various states of the DCT that substantially influence a change of the line pressure.

Accordingly, the absolute values of the coefficients of the state variable of the DCT that are used for the linear regression model gradually decrease in accordance with a sequence.

That is, according to the state variables $ST_1$ to $ST_{11}$, the absolute value of the coefficient of $ST_1$ is greater than the absolute value of the coefficient of $ST_2$, and the absolute value of the coefficient of $ST_2$ is greater than the absolute value of the coefficient of $ST_3$, so that the absolute value of the coefficient of $ST_{11}$ is set to be the smallest in the present way.

$ST_1$ which is the line pressure when the electric oil pump is stopped corresponds to the initial value of the line pressure that starts to decrease. The first clutch target pressure $ST_4$ means a pressure which is obtained by a current-pressure model for the current which is provided to the solenoid valve SV-1 for controlling the first clutch. The corrected first clutch target pressure $ST_6$ means a pressure obtained by applying a correction value for correcting a difference from an actual pressure generated by difference between parts or bias of a detector measurement value to the first clutch target pressure $ST_4$.

The first gear solenoid position $ST_{10}$ is the spool position of the solenoid that drives the actuator 5-1 provided to be able to engage the first gear of the DCT, and the second gear solenoid position $ST_{11}$ is the spool position of the solenoid that drives the actuator 5-2 provided to be able to engage the second gear of the DCT.

Obviously, the first gear solenoid and the second gear solenoid may be set to drive actuators provided to drive other gears. However, in the actuators, the actuators that have the largest influence on a change of the line pressure and should be considered to estimate the line pressure are the actuators for engaging the first gear and the second gear, as described above, so they are set as described above.

The linear regression model includes a fundamental variable and predetermined derivative variables derived from the fundamental variable other than the state variables of the DCT.

Accordingly, the line pressure may be more accurately estimated.

The linear regression model may include several derivative variables.

The fundamental variable may be $X_0$ and the derivative variables may include one or more of $X_1=X_0^2$, $X_2=X_0^3$, and $X_3=X_0^{0.5}$.

In the linear regression model, coefficients of the fundamental variable and the derivative variables are set greater than coefficients of the state variables of the DCT.

That is, in the linear regression model, the fundamental variable and the derivative variables have a larger influence on the change of the line pressure than the state variables of the DCT.

The fundamental variable and the derivative variables of the linear regression model have the relationship of |coefficient of $X_2$|>|coefficient of $X_1$|>|coefficient of $X_0$|>|coefficient of $X_3$|.

That is, $X_2$ is the factor that has the largest influence on the change of the line pressure in the linear regression model.

Accordingly, the linear regression model may be expressed as $Y=P_1*X_2+P_2*X_1+P_3*X_0+P_4*X_3+P_5*ST_1+P_6*ST_2+P_7*ST_3+P_8*ST_4+P_9*ST_5+P_{10}*ST_6+P_{11}*ST_7+P_{12}*ST_8+P_{13}*ST_9+P_{14}*ST_{10}+P_{15}*ST_{11}$ where $P_1$, $P_2$, $P_3$, $P_4$, $P_5$, $P_6$, $P_7$, $P_8$, $P_9$, $P_{10}$, $P_{11}$, $P_{12}$, $P_{13}$, $P_{14}$ and $P_{15}$ are coefficients of the fundamental variable, the derivative variables and the state variables, respectively.

Obviously, the coefficients of $P_1$, $P_2$, $P_3$, $P_4$, $P_5$, $P_6$, $P_7$, $P_8$, $P_9$, $P_{10}$, $P_{11}$, $P_{12}$, $P_{13}$, $P_{14}$ and $P_{15}$ have the relationship of $|P_1|>|P_2|>|P_3|>|P_4|>|P_5|>|P_6|>|P_7|>|P_8|>|P_9|>|P_{10}|>|P_{11}|>|P_{12}|>|P_{13}|>|P_{14}|>|P_{15}|$.

The variables and coefficients of the linear regression model may be shown like the table of FIG. 4.

Furthermore, the term related to a control device such as "controller", "control apparatus", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A line pressure control method for a double clutch transmission (DCT), the method comprising:
    estimating, by a controller, a line pressure, which decreases with stoppage of an electric oil pump, based on a linear regression model using state variables of the DCT that are related to a line pressure change; and
    driving, by the controller, the electric oil pump when the line pressure estimated based on the linear regression model reaches a predetermined lower limit.

2. The method of claim 1, wherein the state variables of the DCT that are used for the linear regression model are the followings:
    $ST_1$: line pressure when the electric oil pump is stopped,
    $ST_2$: first clutch torque,
    $ST_3$: first clutch torque and inclination of pressure model,
    $ST_4$: non-corrected first clutch target pressure,
    $ST_5$: operation state of electric oil pump,
    $ST_6$: corrected first clutch target pressure,
    $ST_7$: estimated first clutch torque based on torque and pressure model,
    $ST_8$: value measured by first clutch pressure detector,
    $ST_9$: second clutch torque,
    $ST_{10}$: first gear solenoid position, and
    $ST_{11}$: second gear solenoid position.

3. The method of claim 2, wherein absolute values of coefficients of the state variable of the DCT that are used for the linear regression model decrease in a sequence of being selected.

4. The method of claim 2, wherein the linear regression model includes a fundamental variable and predetermined derivative variables derived from the fundamental variable other than the state variables of the DCT.

5. The method of claim 4, wherein the linear regression model includes several derivative variables.

6. The method of claim 4, wherein the fundamental variable is $X_0$ and the derivative variables include one or more of $X_1=X_0^2$, $X_2=X_0^3$, and $X_3=X_0^{0.5}$.

7. The method of claim 6, wherein, in the linear regression model, coefficients of the fundamental variable and the derivative variables are set greater than coefficients of the state variables of the DCT.

8. The method of claim 6, wherein the fundamental variable and the derivative variables of the linear regression model have a relationship of |coefficient of $X_2$|>|coefficient of $X_1$|>|coefficient of $X_0$|>|coefficient of $X_3$|.

9. The method of claim 6, wherein the linear regression model is expressed as $Y=P_1*X_2+P_2*X_1+P_3*X_0+P_4*X_3+P_5*ST_1+P_6*ST_2+P_7*ST_3+P_8*ST_4+P_9*ST_5+P_{10}*ST_6+P_{11}*ST_7+P_{12}*ST_8+P_{13}*ST_9+P_{14}*ST_{10}+P_{15}*ST_{11}$,
where $P_1, P_2, P_3, P_4, P_5, P_6, P_7, P_8, P_9, P_{10}, P_{11}, P_{12}, P_{13}, P_{14}$ and $P_{15}$ are coefficients of the fundamental variable, the derivative variables and the state variables, respectively.

10. The method of claim 9, wherein the coefficients of $P_1, P_2, P_3, P_4, P_5, P_6, P_7, P_8, P_9, P_{10}, P_{11}, P_{12}, P_{13}, P_{14}$ and $P_{15}$ have a relationship of $|P_1|>|P_2|>|P_3|>|P_4|>|P_5|>|P_6|>|P_7|>|P_8|>|P_9|>|P_{10}|>|P_{11}|>|P_{12}|>|P_{13}|>|P_{14}|>|P_{15}|$.

11. The method of claim 2, wherein the first gear solenoid position is a spool position of a solenoid that drives an actuator provided to engage a first gear of the DCT, and the second gear solenoid position is a spool position of a solenoid that drives an actuator provided to engage a second gear of the DCT.

12. A double clutch transmission (DCT), comprising:
a controller;
an electric oil pump electrically connected to the controller;
a first actuator fluidically connected to the electric oil pump;
a second actuator fluidically connected to the electric oil pump;
a first solenoid that is electrically connected to the controller and drives the first actuator provided to engage a first gear of the DCT;
a second solenoid that is electrically connected to the controller and drives the second actuator provided to engage a second gear of the DCT, wherein a line pressure is provided to drive the first and second actuators for shifting gears of the DCT,
wherein the controller is configured to:
estimate the line pressure, which decreases with stoppage of the electric oil pump, based on a linear regression model using state variables of the DCT that are related to a line pressure change; and
drive the electric oil pump when the line pressure estimated based on the linear regression model reaches a predetermined lower limit.

13. The DCT of claim 12, wherein the state variables of the DCT that are used for the linear regression model are the followings:
$ST_1$: line pressure when the electric oil pump is stopped,
$ST_2$: first clutch torque,
$ST_3$: first clutch torque and inclination of pressure model,
$ST_4$: non-corrected first clutch target pressure,
$ST_5$: operation state of electric oil pump,
$ST_6$: corrected first clutch target pressure,
$ST_7$: estimated first clutch torque based on torque and pressure model,
$ST_8$: value measured by first clutch pressure detector,
$ST_9$: second clutch torque,
$ST_{10}$: first gear solenoid position, and
$ST_{11}$: second gear solenoid position.

14. The DCT of claim 13, wherein absolute values of coefficients of the state variable of the DCT that are used for the linear regression model decrease in a sequence being selected.

15. The DCT of claim 13, wherein the linear regression model includes a fundamental variable and predetermined derivative variables derived from the fundamental variable other than the state variables of the DCT.

16. The DCT of claim 15, wherein the fundamental variable is $X_0$ and the derivative variables include one or more of $X_1=X_0^2$, $X_2=X_0^3$, and $X_3=X_0^{0.5}$.

17. The DCT of claim 16, wherein, in the linear regression model, coefficients of the fundamental variable and the derivative variables are set greater than coefficients of the state variables of the DCT.

18. The DCT of claim 16,
wherein the fundamental variable and the derivative variables of the linear regression model have a relationship of |coefficient of $X_2$|>|coefficient of $X_1$|>|coefficient of $X_0$|>coefficient of $X_3$|,
wherein the linear regression model is expressed as $Y=P_1*X_2+P_2*X_1+P_3*X_0+P_4*X_3+P_5*ST_1+P_6*ST_2+P_7*ST_3+P_8*ST_4+P_9*ST_5+P_{10}*ST_6+P_{11}*ST_7+P_{12}*ST_8+P_{13}*ST_9+P_{14}*ST_{10}+P_{15}*ST_{11}$, where $P_1, P_2, P_3, P_4, P_5, P_6, P_7, P_8, P_9, P_{10}, P_{11}, P_{12}, P_{13}, P_{14}$ and $P_{15}$ are coefficients of the fundamental variable, the derivative variables and the state variables, respectively, and
wherein the coefficients of $P_1, P_2, P_3, P_4, P_5, P_6, P_7, P_8, P_9, P_{10}, P_{11}, P_{12}, P_{13}, P_{14}$ and $P_{15}$ have a relationship of $|P_1|>|P_2|>|P_3|>|P_4|>|P_5|>|P_6|>|P_7|>|P_8|>|P_9|>|P_{10}|>|P_{11}|>|P_{12}|>|P_{13}|>|P_{14}|>|P_{15}|$.

19. The DCT of claim 13, wherein the first gear solenoid position is a spool position of the first solenoid, and the second gear solenoid position is a spool position of the second solenoid.

* * * * *